US010338910B2

(12) United States Patent
Spieler et al.

(10) Patent No.: US 10,338,910 B2
(45) Date of Patent: Jul. 2, 2019

(54) MULTI-TENANT UPGRADING

(71) Applicant: ENTIT SOFTWARE LLC, Sanford, NC (US)

(72) Inventors: Orasio Spieler, Yehud (IL); Dmitry Vizelman, Yehud (IL); Adi Kopelevich, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/539,885

(22) PCT Filed: Jan. 5, 2015

(86) PCT No.: PCT/US2015/010164
§ 371 (c)(1),
(2) Date: Jun. 26, 2017

(87) PCT Pub. No.: WO2016/111673
PCT Pub. Date: Jul. 14, 2016

(65) Prior Publication Data
US 2017/0371641 A1    Dec. 28, 2017

(51) Int. Cl.
*G06F 9/445* (2018.01)
*G06F 8/65* (2018.01)
(Continued)

(52) U.S. Cl.
CPC .............. *G06F 8/65* (2013.01); *G06F 8/433* (2013.01); *G06F 9/45558* (2013.01); *G06F 8/60* (2013.01);
(Continued)

(58) Field of Classification Search
CPC ........... G06F 8/60; G06F 8/65; G06F 11/1433
See application file for complete search history.

(56) References Cited

U.S. PATENT DOCUMENTS

2010/0211548 A1    8/2010  Ott et al.
2010/0299664 A1    11/2010 Taylor et al.
(Continued)

FOREIGN PATENT DOCUMENTS

JP    2004126960    4/2004
JP    2006113754    4/2006
(Continued)

OTHER PUBLICATIONS

Fatih Gey et al., Evolving Multi-tenant SaaS Application through Self-Adaptive Upgrade Enactment and Tenant Mediation, ACM, IEEE, retrieved online on Feb. 27, 2019, pp. 151-157. Retrieved from the Internet: <URL: http://delivery.acm.org/10.1145/2900000/2897057/p151-gey.pdf?>. (Year: 2016).*
(Continued)

*Primary Examiner* — Hanh Thi-Minh Bui (57) ABSTRACT

Example implementations relate to multi-tenant upgrading. Some implementations may receive a request to upgrade a first tenant from an original version of an application to a new version of the application. The new version of the application may be backwards compatible with the original version. Some implementations may also upgrade the first tenant to the new version in response to the request while data according to the original version is simultaneously being provided to a second tenant. Additionally, some implementations may also provide data according to the new version for tenants that have completed the upgrade and provide data according to the original version of the application for tenants that have not upgraded.

18 Claims, 4 Drawing Sheets

(51) Int. Cl.
*G06F 9/455* (2018.01)
*G06F 8/41* (2018.01)
*G06F 11/14* (2006.01)
*G06F 8/60* (2018.01)

(52) U.S. Cl.
CPC .................. *G06F 11/1433* (2013.01); *G06F 2009/45562* (2013.01)

(56) References Cited

U.S. PATENT DOCUMENTS

| | | | |
|---|---|---|---|
| 2012/0041988 A1* | 2/2012 | Driesen | G06F 16/213 707/803 |
| 2012/0131566 A1 | 5/2012 | Morgan et al. | |
| 2013/0238641 A1* | 9/2013 | Mandelstein | G06F 16/211 707/756 |
| 2013/0246356 A1* | 9/2013 | Taylor | G06F 8/65 707/629 |
| 2014/0164318 A1* | 6/2014 | Tsai | G06F 17/30292 707/609 |
| 2014/0173566 A1 | 6/2014 | Hsu et al. | |
| 2014/0244708 A1 | 8/2014 | Taine et al. | |

FOREIGN PATENT DOCUMENTS

| | | |
|---|---|---|
| JP | 2007179487 | 7/2007 |
| JP | 2010198383 | 9/2010 |
| JP | 2012168760 | 9/2012 |

OTHER PUBLICATIONS

Bhattacharya, P, et al., Dynamic Updates for Web and Cloud Applications, Jun. 6, 2010, 5 pages http://cs.ucr.edu/~pamelab/apiwaca10bhattachrya.pdf.

International Search Report and Written Opinion, cited in PCT/US2015-010164, dated Jul. 7, 2015, 11 pages.

* cited by examiner

MULTI-TENANT UPGRADING

BACKGROUND

Cloud computing may involve large groups of networked computing systems that allow centralized data storage and online access to computer services or resources. For example, cloud computing may provide access, via the Internet, to cloud-based applications that are mirrored many times in the network of computing systems. Cloud-based applications utilized concurrently by multiple customers ("tenants") may be considered to be multi-tenant applications.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Introduction:

In the era of cloud computing, service providers may face challenges when trying to upgrade multi-tenant applications. For example, upgrading an application may require physically replacing the resources associated with each of those multiple instances (i.e., physically replacing the computing devices hosting the instances) one after the other until each resource has been replaced with one that includes the new, upgraded application. Typically, to do this service providers need duplicative sets of physical resources: a first set that hosts the old application, and a second set that contains the upgraded application. To perform the upgrade, the service providers would simply point to the second set of resources once the upgraded application is ready for deployment. However, this approach not only requires the use of a significant amount of physical resources, but also the shift to the new application will require a longer application downtime for all tenants while tenant-related data is copied from the old version to the new version for all of the tenants at the same time. Furthermore, this approach may subject tenants to application downtime during inconvenient time periods since all tenants are upgraded at the same time and cannot select their preferred time for upgrade. Thus, traditional methods of multi-tenant upgrading may result in significant tenant downtime and the unnecessary duplication of physical resources.

The following description is broken into sections. The first, labeled "Setting," describes an environment in which various embodiments may be implemented. The second section, labeled "Components," describes examples of various physical and logical components for implementing various implementations. The third section, labeled "Operation," describes steps taken to implement various examples.

Figure 1:
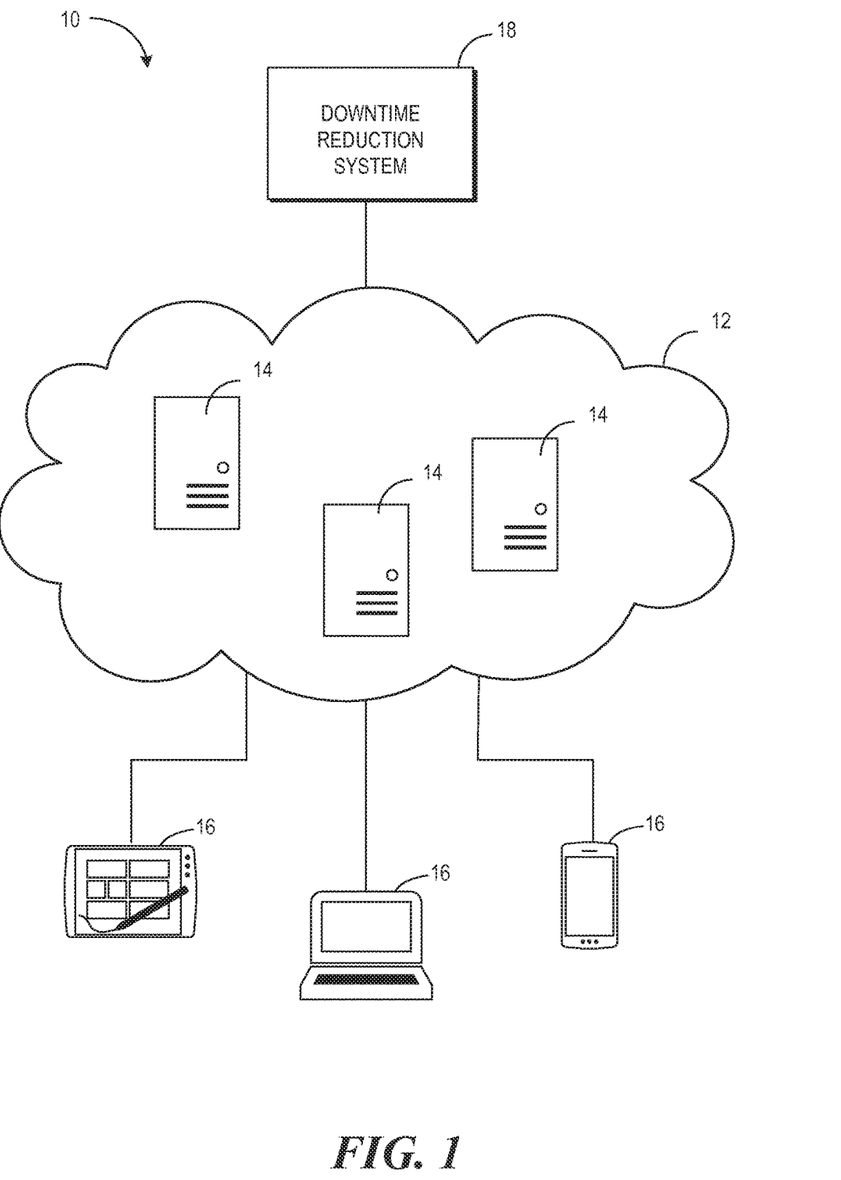
FIG. 1 is a block diagram depicting an example setting in which various examples may be implemented.

Setting:

FIG. 1 is a block diagram of an example setting 10 in which various examples may be implemented. Setting 10 is shown to include cloud environment 12, physical resources 14, client computing devices 16, and downtime reduction system 18. Cloud environment 12 represents generally computing resources (hardware and programming) configured to be provided as a service over a network such as the Internet. Physical resources 14, depicted for efficiency purposes as servers in this example, supply the CPU, memory, networking, and storage resources needed to implement cloud environment 12. For example, applications (e.g., new versions of an application) may be stored on one or more of physical resources 14 for use by cloud environment 12. Users are provided access to application software and databases executing in cloud environment 12 while a cloud provider manages the infrastructure and platforms on which the applications run. In the example of FIG. 1, that infrastructure is represented by physical resources 14.

A cloud controller (not shown in FIG. 1) is responsible for provisioning physical resources 14 to the various components of an application. In doing so, the controller utilizes physical resources 14 to instantiate virtual machines for executing the application components. The virtual machines share physical resources such as CPU, memory, networking, and storage provided by physical resources 14 with a specified portion of each resource allocated to each virtual machine.

Client devices 16 represent generally any computing devices capable of utilizing applications provided within cloud environment 12. Downtime reduction system 18, described in detail below, represents a system configured to receive a request to upgrade a first tenant from an original version of an application executing in cloud environment 12 to a new version of an application executing the same or a similar cloud environment (e.g., cloud environment 12). In general, downtime reduction system 18 may be configured to upgrade a first tenant to the new version of an application while providing data according to the original version of the application to a second tenant. In some examples, the new version of the application may be backwards compatible with the original version of the application. The term backwards compatible, as used herein, means that the application can use files and data created by another (e.g., an older) version of the same application. Thus, in some examples, the data according to the new version of the application and the data according to the original version of the application are both provided via the new version of the application.

Figure 2:
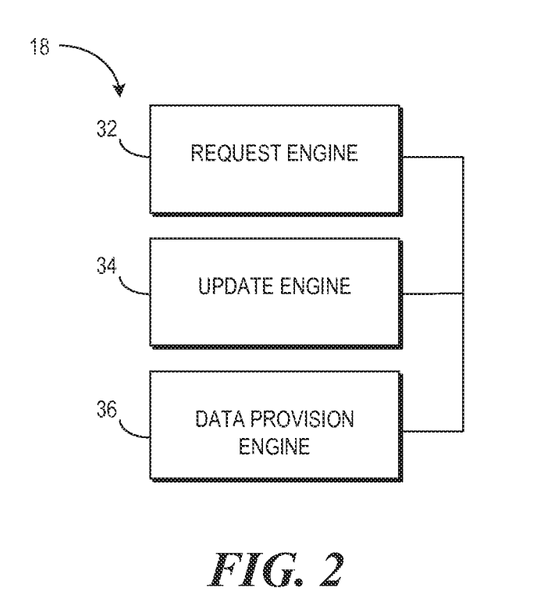
FIG. 2 is a block diagram depicting an example of a downtime reduction system consistent with disclosed implementations.
Figure 3:
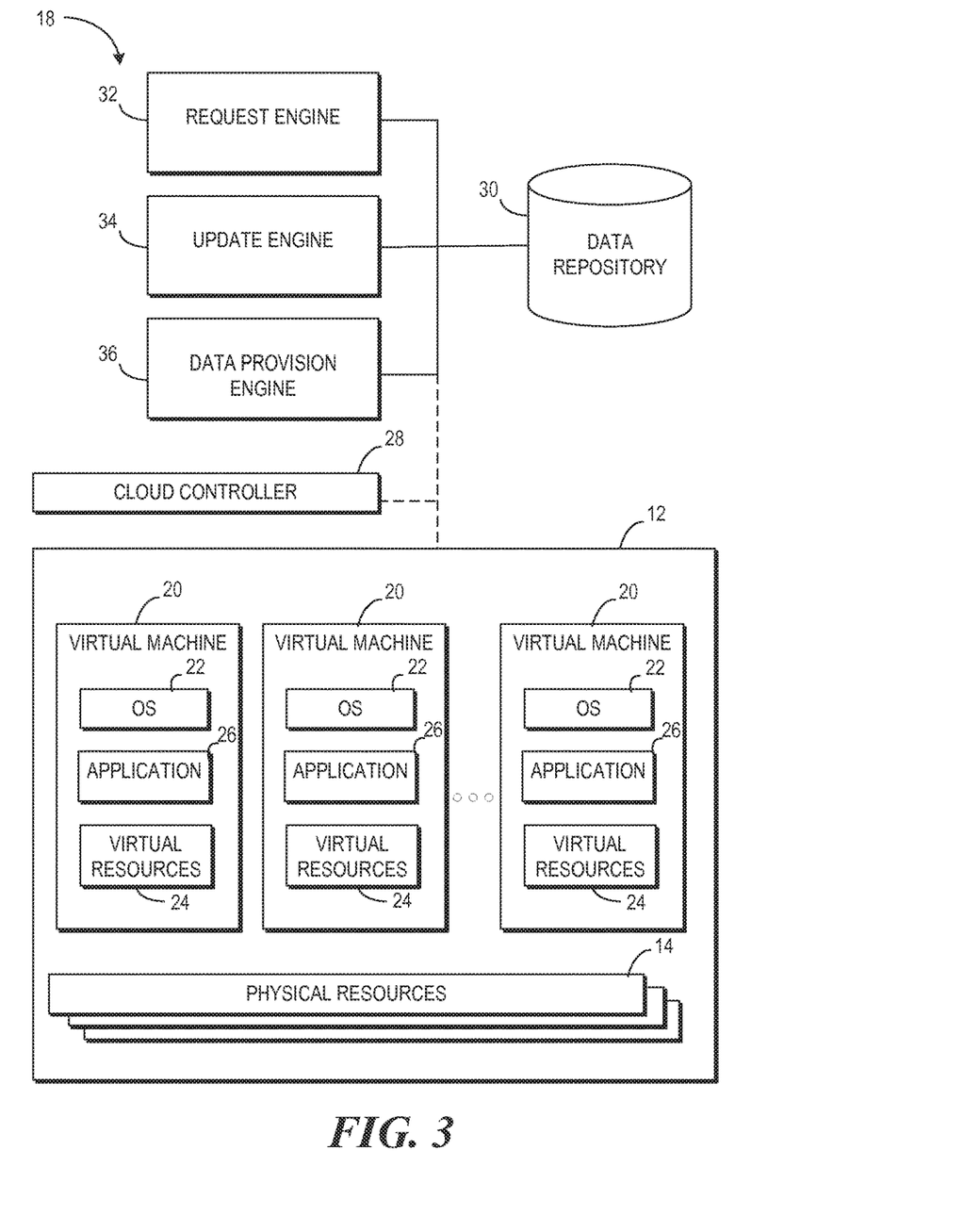
FIG. 3 is a block diagram depicting an example of a downtime reduction system in communication with a cloud environment consistent with disclosed implementations.
Figure 4:
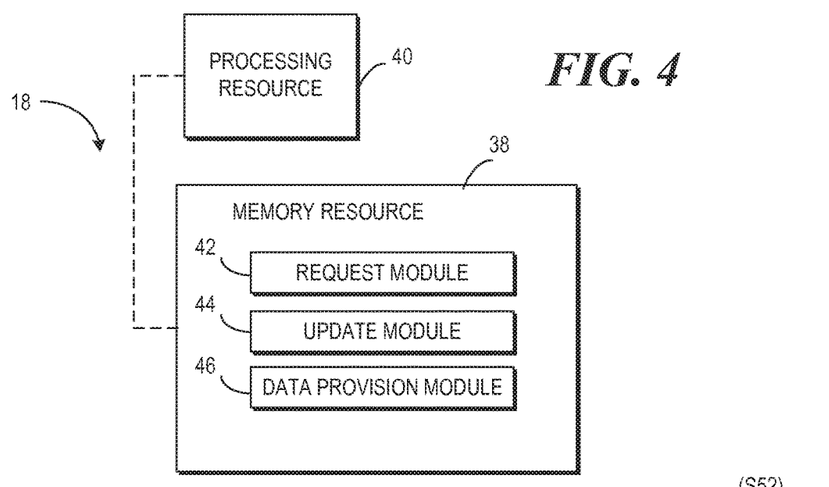
FIG. 4 is a block diagram depicting an example of a memory resource and a processing resource consistent with disclosed implementations.

Components:

FIGS. 2, 3, and 4 depict examples of physical and logical components for implementing various embodiments. In FIGS. 2 and 3 various components are identified as engines 32, 34, and 36. In describing engines 32-36, focus will be on each engine's designated function. However, the term engine, as used herein, refers to a combination of hardware and programming configured to perform a designated function. As is illustrated later with respect to FIG. 4, the hardware of each engine, for example, may include a processing resource (e.g., a processor) and a memory resource (e.g., a memory) while the programing may be code stored on that memory resource and executable by the processing resource to perform the designated function. In another example, the hardware may be the memory resource used to store the code.

FIG. 2 depicts an example of downtime reduction system 18 consistent with disclosed implementations. Downtime reduction system 18 may be implemented in various ways. For example, downtime reduction system 18 may be a special purpose computer, a server, a mainframe computer, and/or any other suitable type of computing device or system. In the example shown in FIG. 2, system 18 may include a request engine 32, an update engine 34, and a data provision engine 36. Engines 32-36 are described in greater detail below with respect to, for example, FIG. 3. Furthermore, process that may be performed by at least one of engines 32-36 are described in greater detail below with respect to, for example, FIG. 5.

FIG. 3 depicts an example of downtime reduction system 18 in communication with a cloud environment 12 consistent with disclosed implementations. In this example, cloud environment 12 includes physical resources 14 and is shown to include a number of instantiated virtual machines 20 each executing one or more applications 26 (in this case new versions of an application) using various corresponding operating systems 22. Each virtual machine 20 may include virtual resources 24. Virtual resources 24 for a given virtual machine 20 represent that virtual machine's allocation of physical resources 14. Again, these physical resources can include CPU, memory, networking, and storage resources.

FIG. 3 also depicts cloud controller 28. Cloud controller 28 may be responsible for executing an instruction received from downtime reduction system 18 to upgrade tenants (e.g., a first tenant) to new versions of an application. Cloud controller 28 may have other functions such as instantiating, replicating, porting, and closing virtual machines 20. In other words, cloud controller 28 is configured to scale applications up or down by managing resource allocation levels and to scale in or out by closing or replicating virtual machines 20. As depicted, cloud controller 28 is independent of cloud environment 28 and represents a combination of hardware and programming configured to implement the functions specified above. In other examples, cloud controller 28 may be part of cloud environment 12 and/or may be implemented by one or more application components executing in one or more virtual machines 20.

Downtime reduction system 18 is shown to be in communication with data repository 30, cloud controller 28, and cloud environment 12. Data repository 30 represents generally any physical memory accessible to downtime reduction system 18 and configured to store data according to an original version of the application and data according to a new version of the application. While shown as being distinct from cloud environment 12, downtime reduction system 18 may be may be part of cloud environment 12 and/or may be implemented by one or more application components executing in one or more virtual machines 20. As discussed above with respect to FIG. 2, downtime reduction system 18 is shown in this example to include request engine 32, update engine 34, and data provision engine 36.

Request engine 32 may function to receive a request to upgrade a tenant (e.g. a first tenant) from an original version of an application to a new version of an application (e.g., a new version of the application that is backwards compatible with the original version of the application). For example, a display device associated with a particular virtual machine 20 may generate an alert that an upgrade is available to the original application and offer options for upgrading (e.g., immediately, during a future time, etc.). A user may select one of the available options by performing a user action (e.g., by clicking a button) on a user interface displayed on the display device, and the virtual machine 20 may transmit the selection to downtime reduction system 18 as the request to upgrade. The upgrade may be performed at a particular time based on the selection.

An upgrade may become available after physical resources 14 have been upgraded with the new version of the application. For example, the original version of the application may be stored using a set of physical resources 14 (e.g., memory resources). A new physical resource (e.g., a first physical resource) including the new version of the application may be added to the set, where the new version is backwards compatible with the original version of the application and upon access will retrieve data according to the original version of the application. For example, the new version of the application may be connected to the same data layer as the original version of the application. Cloud controller 28 may then point to the new physical resource and one of the other physical resources in the set may be shut down and, after the shut down, the new version of the application may be installed on the shut down physical resource. Thus, the new version of the application may be installed on a first physical resource while the original version of the application is executing on other physical resources in the set (e.g., a second physical resource).

Furthermore, cloud controller 28 may direct tenant traffic to the resources in the original set (e.g., to the second physical resource) while the new version of the application is being installed on the first physical resource. For example, until each physical resource 14 in the set has been installed with the new version of the application, cloud controller 28 may direct tenant requests to physical resources 14 in the set that have the original version of the application. In other words, the cloud controller 28 may select one of the original instances the application and thus provide the original version of the application (and data according to the original version) to a tenant making a request. Once complete, the process may be repeated until the new version of the application has been installed on all of the physical resources 14. For example, after the new version of the application has been installed in the other physical resource, cloud controller 28 may point to the other physical resource and yet another physical resource in the set can be removed. In some examples, once all of the instances in the set have been replaced with the new version of the application, the alert described above may be generated.

Upgrade engine 32 may function to upgrade the first tenant to the new version of the application. For example, upgrade engine 32 may function to upgrade the first tenant to the new version in response to a request to upgrade from a first tenant while data according to the original version of the application is simultaneously being provided to a second tenant. Thus, while the first tenant is upgrading to the new version of the application, other tenants (e.g., a second tenant) may still be provided and/or may still otherwise access data according to the original version. This may not only reduce downtime for the first tenant, since the upgrade is only being performed for that particular tenant (and thus the time to copy data and the like is reduced), but does not create downtime for the other tenants (e.g., the second tenant) during the first tenant's upgrade and thus they may continue to receive data according to the original version of the application. Indeed, in some examples, it may appear to the other tenants (e.g., the second tenant) that they are utilizing the original version of the application, even though the data according to the original version of the application is being provided via the new version of the application. Furthermore, in some implementations the data according to the new version of the application and the data according to the original version of the application may be provided via the same instance of the application and/or the same physical resource 14. For example, the new version of the application loaded on a particular physical resource may provide data according to the new version of the application to the first tenant after the upgrade, and the same particular physical resource may provide data according to the original version of the application to non-upgraded tenants (e.g. the second tenant).

Upgrade engine 32 may perform the upgrade of the first tenant to the new version of the application in a number of ways. In some implementations, upgrade engine 32 may upgrade the first tenant by creating a new first tenant record that indicates that the first tenant has upgraded to the new version of the application. For example, upgrade engine 32 may determine whether the first tenant has been upgraded to the new version of the application by accessing an application table. In some examples, the application table may have status indicators associated with each tenant (e.g. upgraded, not upgraded, active, inactive, etc.). If the status indicator associated with the first tenant indicates that the tenant has not been upgraded, upgrade engine 32 may change the status indicator of the first tenant in to inactive during the upgrade and, after the upgrade is complete, to a status indicator that shows that the tenant has been upgraded.

Upgrade engine 32 may also perform the upgrade by creating new schema data associated with the first tenant, where the new schema data comprises data according to the new version of the application. Thus, in some implementations, the new first tenant record may include data according to the new version of the application (i.e., new version application data). For example, upgrade engine 32 may search an application table stored in data repository 30 that may include data according to the original version of the application. Upgrade engine 32 may locate the data associated with the first tenant in the application table and may add data according to the new version of the application table while maintaining the data according to the original version of the application. For example, if the application table comprises rows and columns of data, and each row is associated with a particular tenant, upgrade engine 32 may function to create at least one new column of data that will be used by the new version of the application. The new column of data may be created by parsing the data according to the original version of the application to determine if it includes data needed for the new version of the application and/or copying the data needed as the data according to the new version of the application. In some examples, the copying is only performed for the tenant that is being upgraded (e.g., the first tenant) and/or during the copying process the data is reformatted for access by the new version of the application.

Upgrade engine 32 may also perform the upgrade by storing the new first tenant record in a data repository, such as data repository 30. The data repository may include the original first tenant record (i.e., data according to the original version of the application that is associated with the first tenant) and, upon storage, the new first tenant record. Furthermore, in some implementations, the new schema data may be stored in the application table in a manner that associates it with the first tenant. Thus, in some examples, the application table may include data associated with the original version of the application and data associated with the new version of the application. Furthermore, in creating the data associated with the new version of the application, the data according to the original version of the application isn't changed. In other words, the data according to the original version isn't deleted, modified, and/or otherwise removed during the upgrade.

As a simplified illustrative example, assume that the application table includes records for all the employees in a large company. The data according to the original version of the application includes the street address and the zip code of the employees. The street address is stored in a first column of an application table and the zip code is stored in a second column of an application table. Suppose that the new version of the application not only needs new information (e.g., the state associated with the employee address), but also needs to access the data according to the original version of the application. For example, the new version of the application may be programmed to access two columns of data for the street address instead of one (e.g., the street address in the new version of the application should be divided into two columns: street number and street string). Upgrade engine 32 may parse the data according to the original version of the application to locate the relevant data (e.g., the data contained within the first column) needed by the new version of the application, create two new columns (e.g., street number and street string) to store the data, and copy/store the data in a manner that it can be used by the new version of the application (e.g., by reformatting the data so that the copied street number is put in one of the new columns and the copied street string is put in the other of the two new columns). Thus, the data according to the new version of the application (i.e., the new version application data) and the data according to the original version of the application (i.e., the original version application data) may include the same or similar information, but the data itself is different. In other words, in some examples the new version application data does not include the original version application data.

Data provision engine 36 may function to provide data according to the new version of the application for tenants that have completed the upgrade to the new version of the application and to provide data according to the original version of the application for tenants that have not upgraded to the new version of the application. For example, data provision engine 36 may provide new version application data (e.g., data including the new first tenant record) to the first tenant via the new version of the application. Furthermore, data provision engine 36 may provide original version application data to a second tenant via the new version of the application. In some examples, providing the original version application data to the first tenant includes causing the display of a new user interface, while providing the new version application data to the second tenant includes causing the display of an original user interface. Additionally, data provision engine 36 may provide either the original version application data or new version application data to other tenants. For example, system 18 may receive a request from a third tenant to access the application and determine whether the third tenant has been upgraded to the new version of the application. If the third tenant has been upgraded to the new version of the application, data provision engine 36 may pull new schema data associated with the third tenant from the application table. If the third tenant has not been upgraded to the new version of the application, data provision engine 36 may access original schema data from the application table. The original schema data may comprise the data according to the original version of the application.

The arrangement illustrated in FIG. 3 is simply an example, and system 18 may be implemented in a number of different configurations. For example, while FIG. 3 shows one data provision engine request engine 32, update engine 44, and data provision module 46, system 18 may include any number of components 32-36 as well as other components not depicted in FIG. 3 (or in other figures). For example, system 18 may omit any of engines 32-36 and/or the functionality of at least one of engines 32-36 may be incorporated into another component(s) (e.g., data provision engine 36 may be incorporated with, for example, cloud controller 28).

In the foregoing discussion, engines 32-36 were described as combinations of hardware and programming. Engines 32-36 may be implemented in a number of fashions. Looking at FIG. 4, the programming may be processor-executable instructions stored on tangible memory resource 38 and the hardware may include processing resource 40 for executing those instructions. Thus memory resource 38 can be said to store program instructions that when executed by processing resource 40 implement system 18 of FIGS. 2 and 3.

Memory resource 38 represents generally any number of memory components capable of storing instructions that can be executed by processing resource 40. Memory resource 38 is non-transitory in the sense that it does not encompass a transitory signal but instead is made up of more or more memory components configured to store the relevant instructions. Memory resource 38 may be implemented in a single device or distributed across devices. Likewise processing resource 40 represents any number of processors capable of executing instructions stored by memory resource 38. Processing resource 40 may be integrated in a single device or distributed across devices. Further, memory resource 38 may be fully or partially integrated in the same device as processing resource 40, or it may be separate but accessible to that device and processing resource 40.

In one example, the program instructions can be part of an installation package that when installed can be executed by processing resource 40 to implement system 18. In this case, memory resource 38 may be a portable medium such as a CD, DVD, or flash drive or a memory maintained by a server from which the installation package can be downloaded and installed. In another example, the program instructions may be part of an application or applications already installed. Here, memory resource 38 can include integrated memory such as a hard drive, solid state drive, or the like.

FIG. 4 is a block diagram of an example of a memory resource and a processing resource consistent with disclosed implementations. In FIG. 4, the executable program instructions stored in memory resource 38 are depicted as request module 42, update module 44, and data provision module 46. Request module 42 represents program instructions that when executed cause processing resource 40 to implement request engine 32 of FIGS. 2 and 3. Update module 44 represents program instructions that when executed cause the implementation of update engine 34. Likewise, data provision module 46 represents program instructions that when executed cause the implementation of data provision engine 36.

Figure 5:
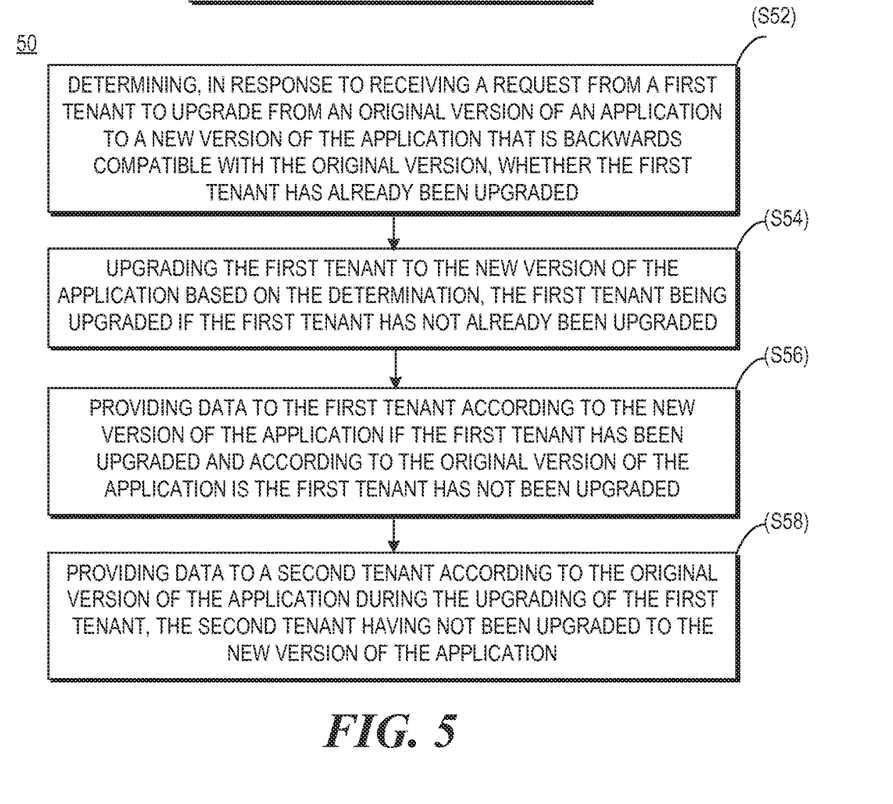
FIG. 5 is a flow diagram depicting an example process for multi-tenant upgrading consistent with disclosed implementations.

Operation:

FIG. 5 is a flow diagram of an example process 50 for multi-tenant upgrading consistent with disclosed implementations. In discussing FIG. 5, reference may be made to at least one of the components depicted in FIGS. 2-4. Such reference is made to provide contextual examples and not to limit the manner in which the method depicted by FIG. 5 may be implemented. For example, processes may be described below as being performed by system 18 may be performed by any suitable device or system consistent with disclosed implementations. Process 50 may be implemented in the form of executable instructions stored on a memory resource and/or in the form of electronic circuitry. For example, process 50 may be performed via a processing resource.

Referring to FIG. 5, system 18 may determine, in response to receiving a request from a first tenant to upgrade from an original version of an application to a new version of the application that is backwards compatible with the original version, whether the first tenant has already been upgraded (step S52). Referring to FIG. 3, request engine 32 of system 18 may be responsible for implementing step S52. In an example, request engine 32 may review an application table (such as the application table discussed above with respect to, for example, FIG. 3) to determine the version of the application the first tenant is using and the status of the tenant and compare that with information detailing the new version of the application. If the version of the application the first tenant is using is older than the information detailing the new version of the application (e.g., the first tenant is using version 1.1 and the new application is version 1.2) and the status of the first tenant is "active," then request engine 32 may determine that the first tenant has not been upgraded. If the first tenant is using the older version of the application and the status of the first tenant is "upgrading," then request engine 32 may determine that the first tenant is in the process of upgrading. If the comparison reveals that the first tenant is using the same version of the application as the new version, then request engine 32 may determine that the first tenant has already been upgraded.

Process 50 may also include upgrading the first tenant to the new version of the application based on the determination (step S54). Upgrade engine 34 of FIG. 3 may implement step S54 with request engine 32 analyzing data stored in data repository 30 for the determination. In an example, if request engine 32 determines that the first tenant has not already been upgraded, upgrade engine 34 may upgrade the first tenant to the new version of the application. For example, upgrade engine 34 may create data needed by the new version of the application to function. To create the data needed, upgrade engine 34 may prevent the first tenant from accessing existing data. For example, upgrade engine 34 may prevent access to the data according to the original version of the application from the first tenant while maintaining access to the data according to the original version of the application for other tenants (e.g., non-upgrading tenants). In some implementations, upgrade engine 34 may prevent access by generating an alert to be displayed on a display device associated with the request that indicates that the first tenant is undergoing an upgrade and/or prevent the first tenant from receiving data according to either the new version of the application and/or the original version of the application.

During the upgrade of the first tenant, the other tenants may continue to access the original version and/or the new version of the application without interruption. In some implementations, upgrade engine 34 may add the data according to the new version of the application to the data according to the original version of the application. For example, while upgrade engine 34 is preventing access to the data according to the original version of the application from the first tenant, upgrade engine 34 may add and/or store data for the first tenant (and not the other tenants) by creating and populating new columns associated with the first tenant without modifying the data according to the original version of the application. Upgrade engine 32 may also perform other processes to upgrade the first tenant, such as the processed described above with respect to, for example, FIGS. 1-4. However, if request engine 32 determines that the first tenant has already been upgraded, upgrade engine 34 may not upgrade the first tenant to the new application. For example, upgrade engine 34 may generate an alert to the first tenant indicating that the upgrade has already been completed. As another example, upgrade engine 34 may simply direct the request to cloud controller 28 to begin providing data.

Process 50 may also include providing data to the first tenant (step S56). In some implementations, the data may be provided according to the new version of the application if the first tenant has been upgraded and according to the original version of the application if the first tenant has not been upgraded. Referring to FIG. 3, step S56 may be implemented by data provision engine 36. In some implementations, data provision engine 36 may provide data based on the determination made by request engine 32 and/or the upgrading performed by upgrade engine 34. For example, if request engine 32 determines that the first tenant has already been upgraded, data provision engine 36 may provide data according to the new version of the application without the need for an upgrade. If, however, request engine 32 determines that the first tenant has not already been upgraded, data provision engine 36 may provide data according to the new version of the application after upgrade engine 32 has completed the upgrade. For example, data provision engine 36 may access data from data repository 30 and may provide the data to the particular instance of the new version of the application associated with the request (e.g., a particular physical resource 14).

Process 50 may also include providing data to a second tenant according to the original version of the application during the upgrading of the first tenant, the second tenant having not been upgraded to the new version of the application (step S58). For example, data provision engine 36 may access data from data repository 30 and may provide the data to the particular instance of new version of the application associated with the second tenant's request for application access. The data provided to the first tenant and/or the second tenant (e.g., the data provided by the original version of the application or the new version of the application) may both be provided via an instance (e.g., a single instance) of the new version of the application. For example, the new version of the application may execute on a particular physical resource 14. In conjunction with system 18, the new version of the application, executing on that physical resource 14, may cause the presentation of the new version of the application to tenants (e.g., the first tenant) that have upgraded (e.g., a new application UI is displayed on a display device associated with the first tenant) and cause the presentation of what appears to be the original application to tenants (e.g., the second tenant) that have not upgrade (e.g., the original application UI is displayed on a display device associated with the second tenant).

Conclusion:

FIGS. 1-5 aid in depicting the architecture, functionality, and operation of various embodiments. In particular, FIGS. 2-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

The disclosed examples may include systems, devices, memory resources, and methods for multi-tenant downtime reduction. For purposes of explanation, certain examples are described with reference to the components illustrated in and/or described with respect to FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-5. For example, the order of execution of two or more blocks or arrows shown in FIG. 5 may be scrambled relative to the order shown. As another example, two or more blocks shown in succession may be executed concurrently or with partial concurrence. All such modifications and variations are intended to be included within the scope of this disclosure and protected by the following claims.

What is claimed is:

1. A system comprising:
a processor; and
a non-transitory storage medium storing instructions executable on the processor to:
receive a request to upgrade a first tenant from an original version of an application to a new version of the application, the new version being backwards compatible with the original version;
upgrade the first tenant to the new version in response to the request while data according to the original version is simultaneously being provided to a second tenant, the upgrading of the first tenant to the new version comprising updating a data table by adding entries to the data table that are according to a new schema for the new version, the added entries including data copied from an entry according to the original version in the data table, wherein the new version is installed on a first physical resource while the original version is executing on a second physical resource; and
provide data according to the new version for tenants that have completed the upgrade and provide data according to the original version of the application for tenants that have not upgraded; and
a cloud controller to direct tenant traffic to the second physical resource while the new version of the application is being installed on the first physical resource.

2. The system of claim 1, wherein the data according to the new version and the data according to the original version are provided by a same physical resource.

3. The system of claim 1, wherein upgrading the first tenant to the new version comprises:
locating first data associated with the first tenant in the data table, wherein the data copied from the entry according to the original version in the data table comprises the first data; and
adding the entries according to the new version to the data table while maintaining the first data according to the original version unchanged in the data table.

4. The system of claim 3, further comprising:
parsing the first data according to the original version to determine if the first data includes data to be used for the new version; and
copying the data to be used for the new version into the added entries, the copying being performed only for the first tenant.

5. The system of claim 4, wherein the copying of the data to be used for the new version comprises reformatting the data to be used for the new version.

6. The system of claim 3, wherein adding the entries comprises:
changing a status of the first tenant in the data table to upgraded; and
associating the added entries with the first tenant.

7. The system of claim 6, wherein providing the data according to the new version and providing the data according to the original version comprises:
receiving a request from a third tenant to access the application;
determining whether the third tenant has been upgraded to the new version;
in response to the third tenant having been upgraded to the new version, pulling data according to the new schema for the new version associated with the third tenant from the data table; and
in response to the third tenant having not been upgraded to the new version, accessing original schema data from the data table, the original schema data comprising the data according to the original version.

8. The system of claim 1, wherein the data according to the new version and the data according to the original version are provided by the new version of the application.

9. The system of claim 1, wherein the added entries are columns added to the data table that are according to the new schema for the new version, and the entry according to the original version is another column in the data table.

10. A non-transitory machine-readable storage medium storing instructions that when executed cause a system to:
receive a request to upgrade a first tenant from an original version of an application to a new version of the application, the new version being backwards compatible with the original version and providing original version data according to the original version and new version data according to the new version;
upgrade the first tenant to the new version in response to the request by creating a new first tenant record, the new first tenant record:
indicating that the first tenant has upgraded to the new version; and
including the new version data,
wherein the new version is installed on a first physical resource while the original version is executing on a second physical resource;
store the new first tenant record in a data repository, the data repository containing an original first tenant record, the original first tenant record including the original version data that is associated with the first tenant;
provide the original version data to a second tenant by the new version of the application;
provide the new version data to the first tenant by the new version of the application, the new version data including the new first tenant record; and
direct, by a cloud controller, tenant traffic to the second physical resource while the new version of the application is being installed on the first physical resource.

11. The non-transitory machine-readable storage medium of claim 10, wherein the new first tenant record including the new version data is separate from the original first tenant record including the original version data in a data table that is part of the data repository.

12. The non-transitory machine-readable storage medium of claim 11, wherein creating the new first tenant record comprises:
locating data in the original first tenant record associated with the first tenant in the data table; and
adding the new first tenant record to the data table while maintaining the original first tenant record.

13. A method executed by a computer system, comprising:
determining, in response to receiving a request from a first tenant to upgrade from an original version of an application to a new version of the application that is backwards compatible with the original version, whether the first tenant has already been upgraded;
upgrading the first tenant to the new version in response to determining that the first tenant has not already been upgraded, the upgrading of the first tenant to the new version comprising updating a data table by adding entries to the data table that are according to a new schema for the new version, the added entries including data copied from an entry according to the original version in the data table, wherein the new version is installed on a first physical resource while the original version is executing on a second physical resource;

providing to the first tenant data according to the new version in response to determining that the first tenant has been upgraded, and providing to the first tenant data according to the original version in response to determining that the first tenant has not been upgraded;

providing to a second tenant data according to the original version during the upgrading of the first tenant, the second tenant having not been upgraded to the new version; and directing, by a cloud controller, tenant traffic to the second physical resource while the new version of the application is being installed on the first physical resource.

14. The method of claim 13, wherein upgrading the first tenant to the new version comprises:

preventing, by the computer system, access to the data according to the original version by the first tenant while maintaining access to the data according to the original version by other tenants.

15. The method of claim 14, wherein the data according to the new version and the data according to the original version are provided by the new version of the application executing on a physical resource.

16. The method of claim 13, further comprising:

parsing first data according to the original version in the data table to determine if the first data includes data to be used for the new version; and copying the data to be used for the new version into the added entries, the copying being performed only for the first tenant.

17. The method of claim 16, wherein the copying comprises reformatting the data to be used for the new version.

18. The method of claim 13, wherein the added entries are columns added to the data table that are according to the new schema for the new version, and the entry according to the original version is another column in the data table.

* * * * *